United States Patent [19]

Lindow

[11] 3,920,925

[45] Nov. 18, 1975

[54] GROUND ISOLATING CIRCUIT

[75] Inventor: Carl E. Lindow, San Jose, Calif.

[73] Assignee: FMC Corporation, San Jose, Calif.

[22] Filed: June 18, 1973

[21] Appl. No.: 370,885

[52] U.S. Cl. .................................. 179/78 R; 333/12

[51] Int. Cl.[2] .......................................... H04B 3/28

[58] Field of Search ............. 325/493, 52; 179/78 R, 179/78 A; 333/12; 328/165; 323/44 R, 57

[56] References Cited

UNITED STATES PATENTS

| | | | |
|---|---|---|---|
| 2,758,286 | 9/1956 | Wible | 333/12 |
| 3,418,603 | 12/1968 | Alexandre | 333/12 |
| 3,518,577 | 6/1970 | Baum | 333/12 |
| 3,715,673 | 2/1973 | Baum et al. | 328/165 |

*Primary Examiner*—Kathleen Claffy
*Assistant Examiner*—Gerald Brigance
*Attorney, Agent, or Firm*—R. S. Kelly; C. E. Tripp

[57] ABSTRACT

In a D.C. power supply circuit having two power leads and a secondary current path through ground, a transformer having very good inductive coupling between its windings is connected in series with the power leads and substantially reduces any pulsating components of the D.C. current passing through the secondary current path. The transformers equalizes the pulsating components of the D.C. currents in the two power leads and thereby reduces the coupling of noise from the D.C. power supply circuit to any signal circuits using the same ground.

10 Claims, 3 Drawing Figures

GROUND ISOLATING CIRCUIT

BACKGROUND OF THE INVENTION

1. Field of the Invention

This invention relates to direct current power supply circuits, and more particularly, to the circuit elements for reducing the current through the secondary current paths of such power supply circuits.

2. Description of the Prior Art

In D.C. power supply circuits there frequently are pulsating components of the D.C. current flowing in the power leads. These pulsating components are small A.C. currents superimposed on the D.C. current. Either the D.C. power supply introduces these pulsating components directly by having a ripple current in its output or the load generates the A.C. currents through its operation. In a D.C. circuit where an electric motor is the load, the constant switching of the commutators generates an A.C. current in the power leads. Generally, it is only in circuits containing pure resistive loads that A.C. currents are not generated by the load.

If these A.C. currents in the power supply circuit flow in close proximity to a signal circuit, they can couple noise into the signal circuit. Typically, the power supply circuit and the signal circuit either share a common ground path or the leads in both circuits inductively couple together. If the operating frequency band of the signal circuit contains the frequency of the noise induced by the A.C. currents or a multiple thereof, then the noise can be very troublesome. In that case the noise from the power supply will be electrically indistinguishable from the signals in the signal circuit and will seriously degrade the operation of the signal circuit.

One conventional means of eliminating the noise in D.C. power supply circuits is to use a D.C. to D.C. converter to isolate the load from the power supply. The D.C. to D.C. converter thereby eliminates the transmission of A.C. currents from the load through the D.C. power leads.

Another means of eliminating the effect of noise generated by D.C. power supply circuits is to raise the frequency of the A.C. induced noise above the operating frequency band of the signal circuit. Then, although the A.C. induced noise is still present, the signal circuit is not affected.

*The Standard Handbook for Electrical Engineers*, 7th ed., N.Y., McGraw-Hill Book Co., 1941, A. E. Knowlton editor, discloses, at page 2,224, a multiwire neutralizing transformer. The transformer is connected in a signal circuit for telegraph communications and is used to cancel any low frequency signal noise induced from nearby low frequency power circuits by injecting compensating voltages in series with the signal circuit.

SUMMARY OF THE INVENTION

In a D.C. power supply circuit having a secondary current path, such as where ground loop currents are present, a current balancing transformer is used to substantially eliminate any A.C. currents in the secondary current path. The D.C. circuit of the present invention includes a D.C. power supply, a resistive load, an A.C. noise generating source, two power supply leads connecting the D.C. power supply with the load, a current balancing transformer, and a secondary current path connecting the D.C. power supply with the resistive load. The current balancing transformer has very good inductive coupling between its windings and is connected in series to the two power supply leads. The transformer significantly reduces the A.C. current in the secondary current path by substantially equalizing the A.C. currents in each of the two power supply leads.

DESCRIPTION OF THE PREFERRED EMBODIMENT

In general, for a D.C. power supply circuit, the current balancing transformer of the present invention substantially reduces the pulsating components of the current in a secondary or ground current path. The pulsating components of the current are herein referred to as an A.C. current and the primary current from the power supply as a D.C. current. In addition, the pulsating components of the current can be either periodic or random.

Figure 1:
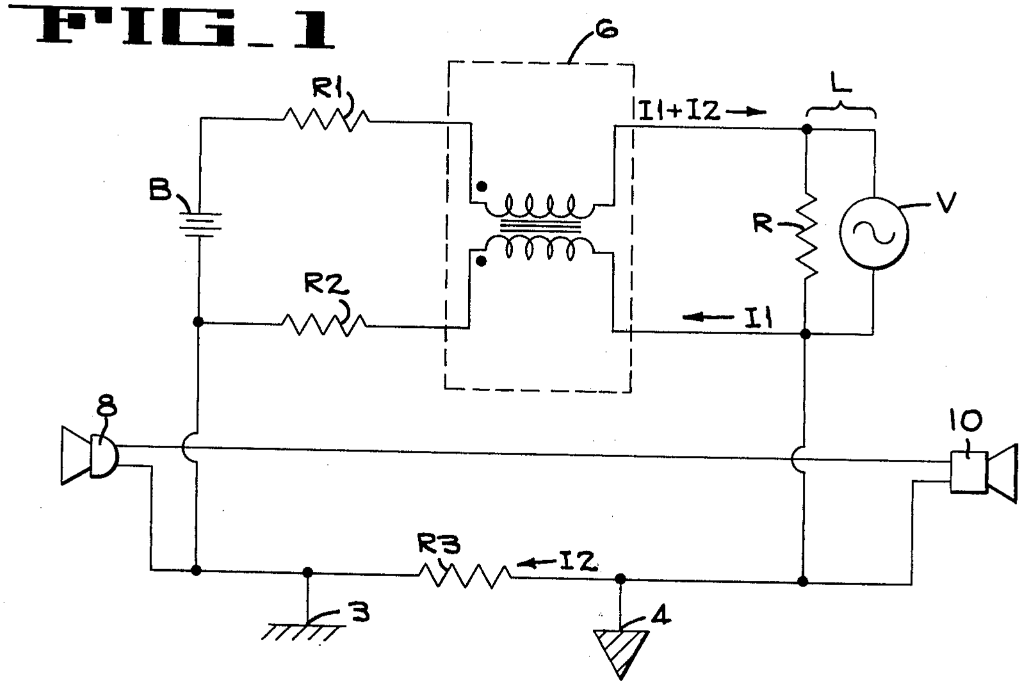
FIG. 1 is an electrical schematic diagram illustrating a D.C. power supply circuit having a current balancing transformer in accordance with the present invention, and a signal circuit, both circuits being conductively coupled by a common secondary current path through ground connections.
Figure 2:
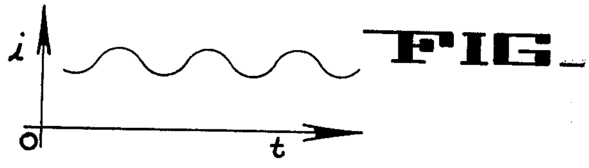
FIG. 2 is a graph illustrating the combined A.C. and D.C. currents flowing in either power lead to the power supply or in the secondary current path of the circuitry shown in FIG. 1.

Referring to FIG. 1, reference letter B indicates a direct current (D.C.) power supply. The D.C. power supply can be of any conventional construction including, for example, a storage battery or a regulated power supply. Connected in series with the D.C. power supply is a load L. The load may be of any conventional type and is shown as being comprised of a purely resistive load R and an alternating current load V. The A.C. load, V, can be any conventional circuit element that produces an A.C. current in the D.C. power supply circuit. In one embodiment of the present invention that was constructed, the load L was a conventional D.C. to D.C. converter as hereinafter described.

The load L is connected to the power supply B by two power supply leads having lead resistances R1 and R2. In addition, the power supply B is grounded at a point indicated by reference numeral 3, and the load L is grounded at a point indicated by reference numeral 4. The ground points 3 and 4 are electrically connected together and have a resistance R3 therebetween representing some small actual resistance between the two ground points. In one embodiment of the present invention that was constructed, the ground point 3 was a ground strap connecting the D.C. power supply to a mounting frame (not shown) and the ground point 4 was a grounded housing (not shown) of the load L that was attached to the same mounting frame (not shown).

Connected between the D.C. power supply B and the load L is a current balancing transformer 6. The current balancing transformer is connected in series to the power supply leads and has very good inductive coupling between its two windings. In order to provide satisfactory frequency response, the magnitude of the inductive reactance of the transformer at the frequency of the A.C. current is at least 10 times larger than the resistance of the power supply circuit. In one embodiment of the present invention that was constructed, the transformer had a one-to-one turns ratio and a coupling coefficient of 0.997.

Sharing the common ground points 3, 4 with the D.C. power supply circuit is a conventional audio signal circuit. The audio signal circuit is comprised of a microphone 8 and a loud speaker 10. This signal circuit is of conventional construction, and the power supplies and amplifiers normally provided therein have been omitted for clarity. It will be appreciated that the audio signal circuit also contains the small ground resistance R3 between the ground points 3 and 4.

One embodiment of the present invention includes a circuit that utilized a D.C. power supply circuit for a radio transmitter mounted in a motor vehicle. The D.C. power supply B was the vehicle's storage battery, and the load L was a conventional, transistorized, D.C. to D.C. converter with a saturating core having an operating frequency of 400 Hz. The D.C. to D.C. converter, in turn, served as the power supply for the radio transmitter. The audio signal circuit was a microphone connected to a preamplifier that provided the audio input to the radio transmitter. The storage battery, the D.C. to D.C. converter, and the microphone-preamplifier were all grounded through their cases to the frame of the vehicle. The location of these grounding points was not coincident, so a small ground resistance R3 was created.

When the circuit illustrated in FIG. 1 is operated without the current balancing transformer 6, the A.C. load V generates a small A.C. current that combines with the direct current provided by the D.C. power supply B. The current through the lead resistance R1 is indicated by the reference letters I1+I2; the current through the other complementary lead resistance R2 is indicated by the reference letters I1; and the current through the secondary current path containing resistance R3 is indicated by the reference letters I2. As can be seen from FIG. 1, the current I2 in the ground loop plus the current I1 in the power supply lead equals the current I1+I2 in the other power supply lead.

The alternating current from the A.C. load V in the power supply circuit generates a small voltage across the ground resistance R3. This small voltage is picked up and amplified in the audio signal circuit and thereby acts as a noise source. If the frequency of the A.C. current is within the operating frequency range of the audio signal circuit, then the noise substantially interferes with the audio signal transmitted between the microphone and the loud speaker. In short, the loud speaker cannot distinguish between the signals coming from the microphone or from the ground resistance.

The current balancing transformer 6 is placed in the power supply circuit in series with the power supply leads between the D.C. power supply B and the load L. The transformer operates to force the currents in the two power supply leads to equalize and to make the A.C. currents therein equal and opposite. In other words, the magnitude of the pulsating component of current I1+I2 in lead resistance R1 is made to approach the magnitude of the pulsating component of current I1 in lead resistance R2. The net effect is to diminish the magnitude of the current I2 in the secondary current path and to force I2 to approach zero.

Figure 3:
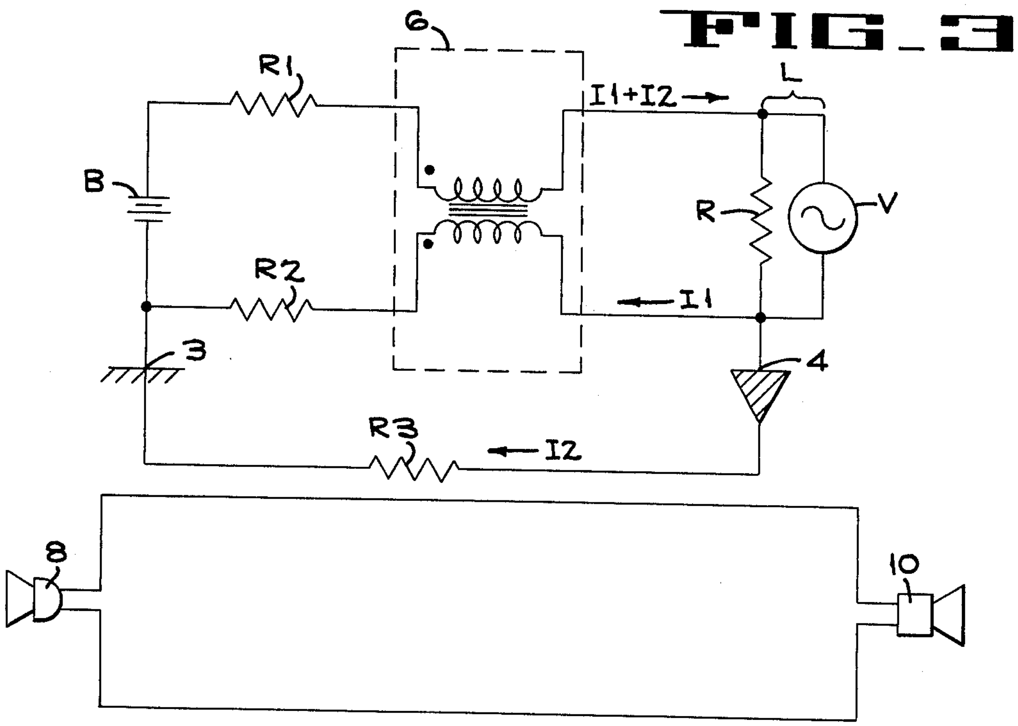
FIG. 3 is an electrical schematic diagram illustrating a D.C. power supply having a current balancing transformer, in accordance with the present invention, and a signal circuit, the power supply circuit being grounded and the signal circuit being inductively coupled to the power supply by the secondary current path through the ground path.

An alternative embodiment of the present invention is illustrated in FIG. 3. The D.C. power supply has the same circuit elements and is connected in the same manner as hereinbefore described with respect to FIG. 1. The audio signal circuit, however, does not share a common ground with the power supply circuit and does not contain a good resistance.

In the circuit of FIG. 3, the D.C. power supply circuit induces noise in the audio signal circuit by magnetic induction. The current path through the power supply leads is physically displaced from the current path through points 3 and 4 of the ground loop. This physical separation of the conducting paths and the flow of current around the circuit creates a magnetic field that inductively generates a voltage in the leads in the audio signal circuit. The inductively induced voltage appears as noise at the output of the signal circuit.

When the current balancing transformer 6 is inserted into the D.C. power supply circuit, as illustrated in FIG. 3, the current I2 through the secondary current path is reduced. By reducing the current I2 to a negligible amount, the magnetic field created by the secondary current path is also reduced. Thus, the noise induced by magnetic induction between the power supply and the audio signal circuit is reduced.

Although the preferred embodiment of the invention includes the use of a D.C. power supply and an audio signal circuit it is to be understood that the present invention is not to be so limited. In addition, the current balancing transformer can operate successfully in circuits wherein the A.C. current is introduced by the D.C. power supply and not by the load. The current balancing transformer can, therefore, eliminate A.C. currents independently of their source of origin in the circuit. Moreover, any signal or control circuit operating outside of the audio frequency band that is troubled by noise induced in the manner hereinbefore described can be aided by the current balancing transformer of the present invention. The use of this transformer is not intended to be limited to the audio frequency band.

Although the best mode contemplated for carrying out the present invention has been herein shown and described, it will be apparent that modification and variation may be made without departing from what is regarded to be the subject matter of the invention.

What is claimed is:

1. In a circuit comprising:

a D.C. power supply having two power leads;

a load having a resistive component connected to the D.C. power supply by the power leads;

means in said circuit for generating a pulsating current component; and means providing a secondary current path connecting the D.C. power supply with the resistive load;

the improvement comprising a transformer having a pair of windings and having very good inductive coupling between its windings, each of said windings being connected in series between a corresponding one of said power leads of the D.C. power supply and the load, whereby the pulsating current component in the secondary current path is reduced by equalizing the pulsating current components in the power leads.

2. A circuit as set forth in claim 1 wherein said means for generating a pulsating current is provided by said load.

3. A circuit as set forth in claim 1 wherein said transformer has a one-to-one turns ratio and a coupling coefficient of at least 0.95.

4. A circuit as set forth in claim 1 wherein said transformer has an inductive reactance at least 10 times as large as the impedance of the resistive load.

5. In circuitry comprising:

a D.C. power supply having two power leads;

a load having a resistive component connected to the D.C. power supply by the power leads;

means in said D.C. power supply circuit for generating a pulsating current component;

an alternating current signal circuit comprising a signal generating means, a signal transmitting means and leads therebetween, said signal circuit having an operating frequency band containing the frequency of the pulsating current component; and a secondary current path connecting the D.C. power supply with the load and connecting a portion of the signal circuit between said signal generating means and said signal transmitting means, whereby the power supply circuit is conductively coupled to the signal circuit;

the improvement comprising a transformer having a primary winding and a secondary winding, said primary winding being connected between a first power lead and said load, said secondary winding being connected between a second power lead and said load, said transformer having very good inductive coupling between its windings, whereby the pulsating current component in the secondary current path is reduced by equalizing the pulsating current components in the power leads.

6. Circuitry as set forth in claim 5 wherein said alternating current signal circuit has an operating frequency band containing a harmonic of a fundamental frequency of the pulsating current component.

7. In a circuit comprising:

a D.C. power supply having two power leads;

a load having a resistive component connected to the D.C. power supply by the power leads, said load including means for generating a pulsating current component;

a secondary current path connecting the D.C. power supply with the load; and an alternating current signal circuit comprising a signal generating means, a signal transmitting means, and leads therebetween, said leads being inductively coupled to the secondary current path, said signal circuit having an operating frequency band containing the frequency of the current pulsating component;

the improvement comprising a two winding transformer having very good inductive coupling between its windings, each of said windings being connected in series between a corresponding one of said power supply leads and the load, whereby the pulsating current component in the secondary path is reduced by equalizing the pulsating currents in the power leads.

8. In a circuit as set forth in claim 7 wherein said alternating current signal circuit has an operating frequency band containing a harmonic of the fundamental frequency of the pulsating current component.

9. In a circuit comprising a D.C. power supply and a load having a resistive component with a secondary current path in a ground loop, the improvement comprising a transformer having a pair of windings, a first winding being connected in series between a first end of said D.C. power supply and said load, a second winding being connected in series between a second end of said D.C. power supply and said load for reducing the A.C. currents in said ground loop.

10. In a circuit as set forth in claim 9, said transformer having a one-to-one turns ratio and a coupling coefficient of at least 0.95.

* * * * *